United States Patent
Pozzetti et al.

[11] Patent Number: 5,688,160
[45] Date of Patent: Nov. 18, 1997

[54] APPARATUS FOR THE DYNAMIC BALANCING OF A ROTATING BODY

[75] Inventors: Mario Pozzetti, Bologna; Domenico Malpezzi, Brisighella, both of Italy

[73] Assignee: Marposs Societa' Per Azioni, Italy

[21] Appl. No.: 492,044

[22] PCT Filed: Mar. 14, 1994

[86] PCT No.: PCT/EP94/00789
§ 371 Date: Sep. 14, 1995
§ 102(e) Date: Sep. 14, 1995

[87] PCT Pub. No.: WO94/21995
PCT Pub. Date: Sep. 2, 1994

[30] Foreign Application Priority Data

Mar. 22, 1993 [IT] Italy .................. BO93A0097

[51] Int. Cl.⁶ ...................................... B24B 49/00
[52] U.S. Cl. .................. 451/5; 451/343; 74/573 R; 73/468
[58] Field of Search .............. 451/5, 343; 73/468; 74/573 R

[56] References Cited

U.S. PATENT DOCUMENTS 5,240,358  8/1993  Hackett et al. ................. 451/343
5,540,615  7/1996  Murtuza ......................... 451/343
5,549,019  8/1996  Cattani .......................... 451/343

FOREIGN PATENT DOCUMENTS 0 296 593    6/1988   European Pat. Off. .
0 460 282 A1 10/1990   European Pat. Off. .
0 569 774 A1  4/1993   European Pat. Off. .
2 597 203   10/1987   France .
37 43 432 A1 7/1988   Germany .

Primary Examiner—Robert A. Rose
Assistant Examiner—George Nguyen
Attorney, Agent, or Firm—Dickstein Shapiro Morin & Oshinsky LLP

[57] ABSTRACT

An apparatus for balancing a rotating body, in particular the grinding wheel of a grinding machine, comprises an assembly secured to the grinding wheel and rotating with it, with masses having an adjustable arrangement, electrical motors for controlling adjusting movements of the masses, and electrical circuits with a microprocessor unit. A transceiver terminal between a control unit and the rotating assembly provides a first contactless transmission channel for inductively coupling a fixed power source to the rotating parts, and a second contactless transmission channel for transmitting information in both directions. The second transmission channel may comprise optoelectronic devices.

17 Claims, 4 Drawing Sheets

APPARATUS FOR THE DYNAMIC BALANCING OF A ROTATING BODY

TECHNICAL FIELD

The present invention relates to an apparatus for the dynamic balancing of a body rotating about a longitudinal axis with respect to a support, including: an assembly fixed to and rotating with said body, the assembly comprising at least one mass, the position of which is adjustable, and at least one electric motor connected to adjust the reaction of the mass; control means for controlling the naster; power supply means; and a between the assembly and both the control means and the power supply means.

In particular, the invention relates to an apparatus for dynamically balancing the grinding wheel of a grinding machine.

BACKGROUND ART

Undesired vibrations are generally present in a grinding machine, and are generated by out-of-balance conditions of the grinding wheel due to various possible reasons depending on the wheel itself, such as: shape and/or constitution defects (inhomogeneity of the materials, concentricity errors between the external abrading surface and the internal centering hole, etc.), inaccurate mechanical coupling to the rotating spindle (hence causing the wheel center of gravity to be spaced apart from the rotation axis), and, in general, deteriorations due to wear and/or splintering during the machining operations of workpieces. These vibrations may cause inaccuracies in the characteristics of the machined workpieces, such as roundness errors (ovality and lobing), and introduce loads and stresses that may damage the machine tool. Known balancing are coupled to the grinding wheel and comprise movable masses driven by electric motors that adjust the position of the masses, in the course of the wheel rotation, along radial or, more often, angular paths in order to compensate the previously mentioned out-of-balance conditions. The driving motors are also part of the apparatus, rotate along with it and the wheel, and are fed by a fixed external power source, through an electric coupling, including sliding contacts such as, for example, slip rings and sliding brushes.

The characteristics (like frequency, amplitude, and/or other) of the vibrations generated by an out-of-balance condition of a rotating body are picked up by processing the signals provided by an appropriate sensor, and displayed, or are further processed in a proper unit (that also comprises the previously mentioned power supply source) for sending "balancing" signals to the motors, in order to properly drive the movable masses, by means of an electric coupling including the same, or different slip rings.

A balancing apparatus which has the previously mentioned features is shown and described in patent U.S. Pat. No. 3,698,263. In such apparatus, the motors for driving the masses are manually controlled by an operator on the basis of the vibration parameters that are displayed by an instrument. A problem of the known apparatuses is represented by the wear that the brushes undergo when they remain in contact with the relevant slip rings in the course of the grinding wheel rotations, and by the subsequent need to frequently perform maintenance and replacement operations.

In other known apparatuses, in order to overcome the inconveniences caused by the sliding contacts, there is a battery in the rotating part, means that enable the "wireless" recharge of the battery, and means for providing control signals for the displacement of the masses. An apparatus of this type is described in patent application DE-A-3743432, wherein the recharge of the battery occurs in the course of the rotation along with the wheel, by means of a "dynamo" charging generator, comprising a stator that is stationary with respect to the wheel and an idle rotor.

The control signals are optically transmitted from a stationary part to the rotating assembly, thus driving the displacement of the balancing masses.

It should be realized, however, that the layout dimensions may cause a problem as the space available may not always be sufficient to accomodate the insertion of the battery. Furthermore, no information regarding the charge of the battery is available unless the apparatus is stopped and disassembled; and it is also necessary to stop the apparatus whenever the position of the masses has to be checked, and in the event there occurs any malfunction whatsoever of the assembly rotating along with the wheel.

DISCLOSURE OF THE INVENTION

An object of the present invention is to provide a balancing apparatus that overcomes the disadvantages of the known apparatuses, ensures improved reliability and flexibility of use, and also reduces the costs and the down-time of the machine tool.

This object is achieved, and other advantages are attained, by an apparatus according to the present invention, in which the assembly further comprises circuitry electrically connected to the electric motor for providing signals controlling the displacements of the mass and adjusting its position, the matter and thus the coupler comprises a first contactless transmission channel coupling the power supply means to the rotating assembly and at least a second contactless transmission channel between the control means and the circuitry. The first transmission channel comprises an electromagnetic coupling, while the second transmission channel is distinct from the first and enables a transmission of signals in both directions between the control means and the circuitry.

BRIEF DESCRIPTION OF THE DRAWINGS

The invention is hereinafter described in more detail with reference to the enclosed sheets of drawings, given by way of non-limiting example only, wherein.

BEST MODE FOR CARRYING OUT THE INVENTION

Figure 1:
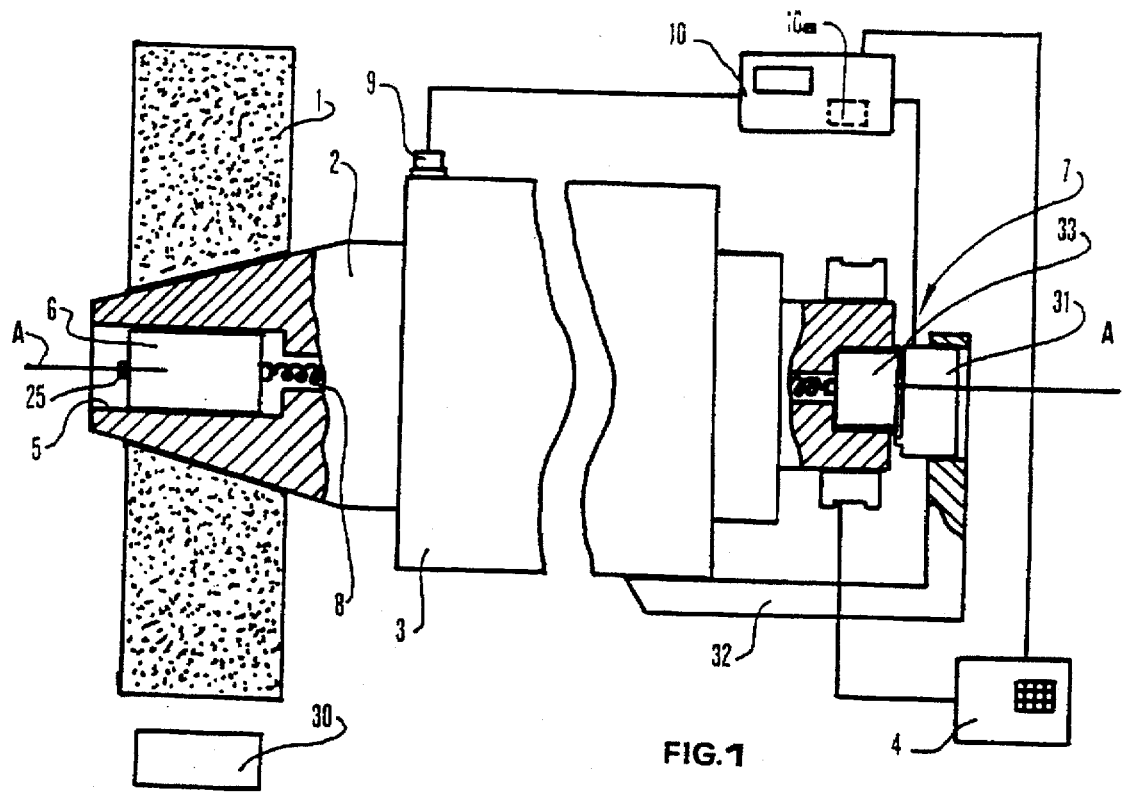
FIG. 1 is a schematic longitudinal view, partially cross-sectioned, of a machine tool comprising a device according to the present invention.

According to the arrangement shown in FIG. 1, a grinding wheel 1 of a grinding machine is connected to a rotating body, or spindle, 2 and rotates along with it about a longitudinal axis A with respect to a support 3, for example a wheel slide, under the control of a control unit, or programmable logic controller 4, for machining a mechanical piece 30.

A longitudinal cavity 5 in the spindle 2 houses an assembly comprising a balancing device 6 for the dynamic balancing of the wheel 1, part of a coupling assembly with a transceiver unit 7, and a cable 8 for the connection between the unit 7 and the balancing device 6. A vibration detecting sensor 9 is fixed to the machine tool and is electrically connected to a controller, in particular to a processing and control unit 10 to which it sends electrical signals responsive to the vibrations of the rotating parts (grinding wheel I and spindle 2). The processing and control unit 10 is electrically connected in turn, to the logic controller 4 and, through the transceiver unit 7, to the balancing device 6.

Figure 2:
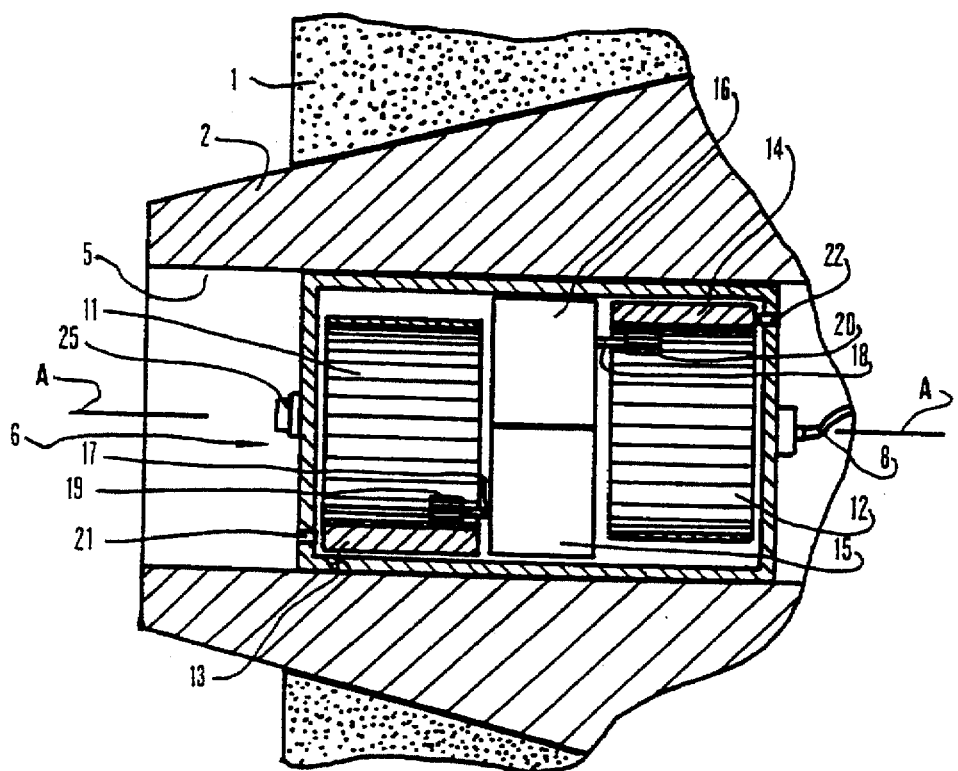
FIG. 2 is an enlarged scale longitudinal cross-sectional view of a detail of the device shown in FIG. 1.

The device 6, more clearly shown in FIG. 2, substantially comprises two annular elements 11, 12, that rotate about axis A, with internal gear surfaces each bearing a compensation mass 13, 14, respectively, having the shape of a part of a hollow cylinder. Two electric motors 15, 16 are positioned so that their associated rotating stems 17, 18 lie parallel to axis A; the stems 17, 18 are coupled, by means of gears identified by reference numbers 19, 20 in the drawings, to the annular elements 11, 12, for causing axial rotational displacements of the latter. Thus, it is possible to adjust the angular position of masses 13, 14 for performing the balancing operation in a per se known way.

Two additional sensors of a known type, for example Hall-effect magnetic sensors, are schematically illustrated in FIG. 2 and are identified by reference numbers al and They are fixed to the casing of device 6 and electrically connected to unit 7 by means of electrical wires of cable 8. Surface areas with suitable magnetic characteristics are provided, in a known way not shown in the drawing, on the external surfaces of the masses 13, 14 and the sensors 22 provide appropriate electric signals when the surface areas on masses 13, 14, respectively, are before them. In particular, the areas are provided in such positions that they are faced by the associated sensors 21, 22 when the masses 13, 14 (or, more specifically, their centers of gravity) are arranged substantially at angular positions diametrically opposite with respect to axis A. The signals provided by sensors 21, 22 thus indicate such an arrangement, or rest position of the masses 13, 14, that does not contribute substantially to an out-of-balance condition wheel 1.

A supplementary vibration detecting sensor 25, for example of the piezoelectric type, is secured to the balancing device 6, and is electrically connected to the transceiver unit 7 by means of electric wires of cable 8.

The sensor 25 detects vibrations caused by the contact occurring between the wheel i and the piece 30 to be machined and, through the transceiver unit 7 and the processing and control unit 10, sends to the logic controller 4 related signals that are used in a known way for changing the speed of mutual displacement between the wheel slide 3 and the piece 30 in the course of the grinding operations of the latter.

The transceiver unit 7 substantially comprises two parts: a non-rotating part 31 secured to the support 3, by means of an arm schematically shown in FIG. 1 and identified by reference number 32, and a rotating part 33 housed in the cavity 5 of spindle 2.

Figure 3:
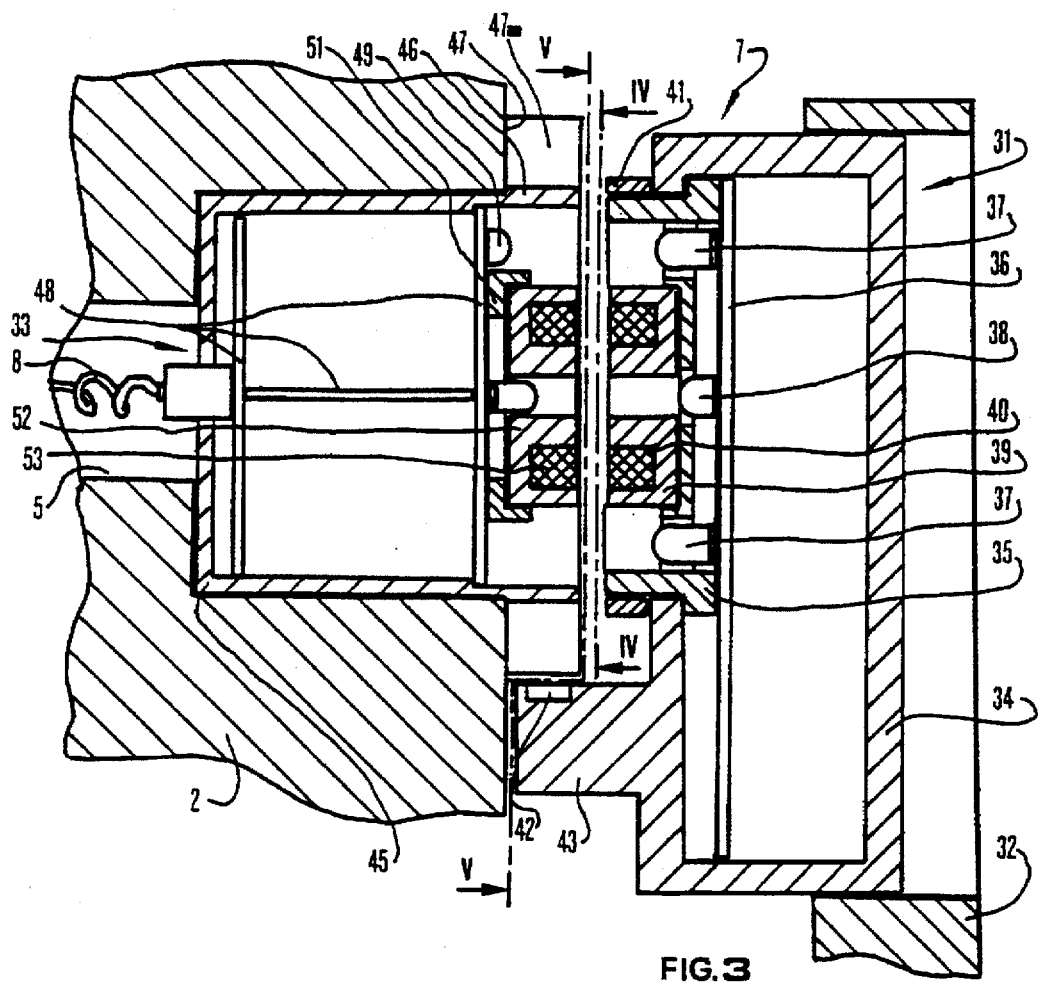
FIG. 3 is an enlarged scale, longitudinal cross-sectional view of another detail illustrated in FIG. 1.
Figure 4:
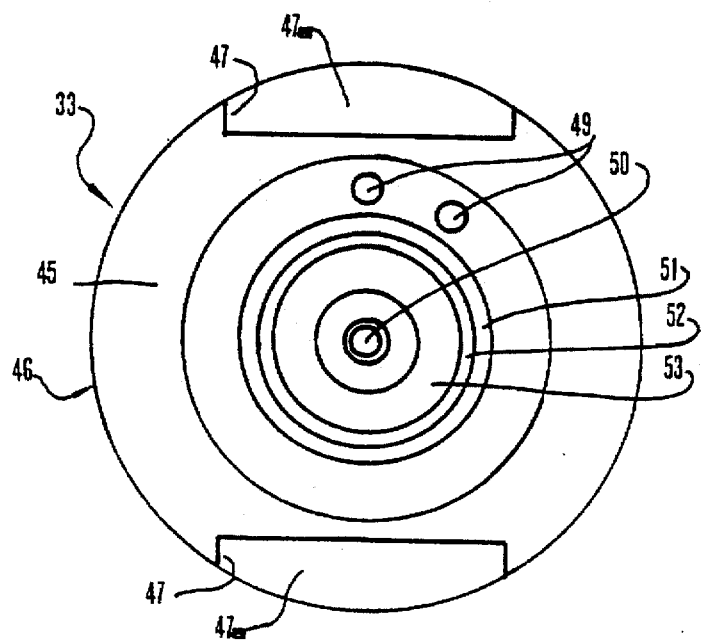
FIG. 4 is a cross-sectional view of the device of FIG. 3, along line IV—IV in FIG. 3.
Figure 5:
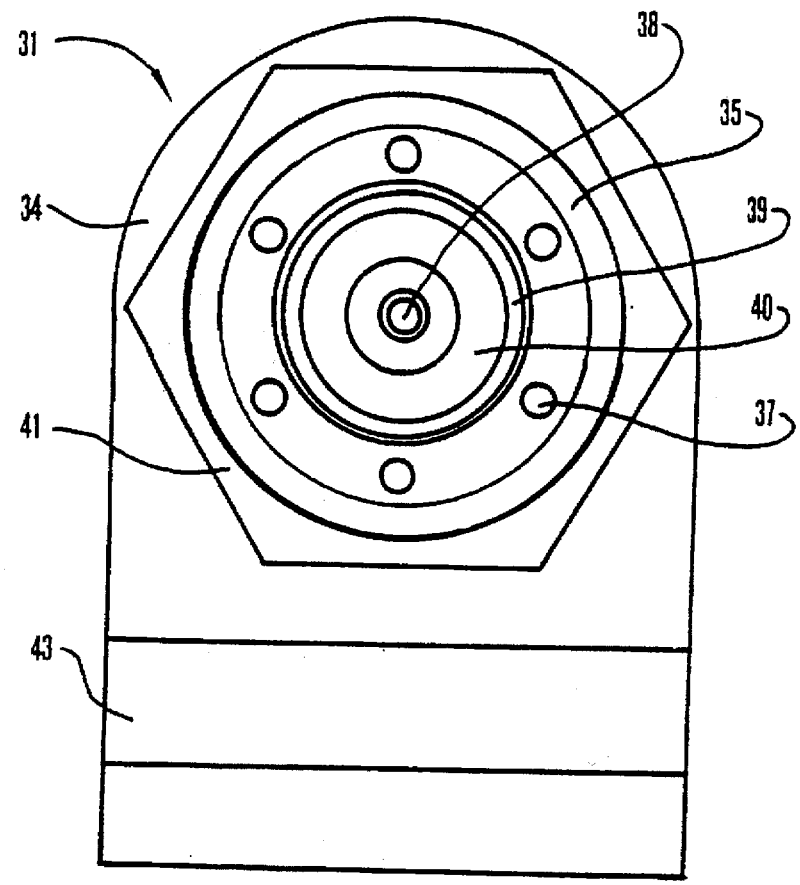
FIG. 5 is a cross-sectional view of the device of FIG. 3 along line V—V in FIG. 3.

The transceiver unit 7 enables the contactless coupling between the processing and control unit 10 (that also comprises power supply means with a source 10a) and the balancing device 6, and is schematically shown in figures 3, 4 and 5.

The non-rotating part 31 (FIGS. 3 and 5) comprises a casing 34 and a support and reference element 35, a printed circuit 36 fixed to element 35, optoelectronic devices connected to the printed circuit 36, with six light emitting diodes ("LED") 37 and a photodetector 38, and a first cylindrical ferromagnetic cap 39, also fixed to element 35, that defines a seat for first electrical windings 40, in turn electrically connected to printed circuit 36. A nut 41 enables the coupling of the support and reference element 35 to the casing 34, and a proximity sensor 42 is fixed to a flange 43 of casing 34 and is electrically connected (in a way that is not shown in the figures) to the processing unit 10.

The rotating part 33 (FIGS. 3 and 4) comprises a casing 45 with a cylindrical flange 46 made of metal (or other conductive material), that defines two notches 47 located at diametrically opposite positions. Plastic material 47a (or other non-conductive material) is present in these notches 47 to substantially complete the cylindrical shape of flange 46. Printed circuits 48 are housed and fixed in casing 45 and bear optoelectronic devices with two photodetectors 49 and a light emitting diode ("LED") 50, and a support and reference element 51. A second ferromagnetic cylindrical cap 52, secured to element defines a seat for second electrical windings electrically connected to the printed circuits 48.

Casing 45 is inserted in cavity 5 in the spindle 2 with flange 46 protruding, the parts of the transceiver unit 7 being positioned in such a way that the flanges 43 and belonging to the non-rotating part 31 and to the rotating part 33, respectively, radially face each other, hence enabling the proximity sensor 42 to detect and monitor, in the course of the rotation of spindle 2, the passage of notches 47 before it, allowing to determine in this way the rotation speed of spindle 2.

Figure 6:
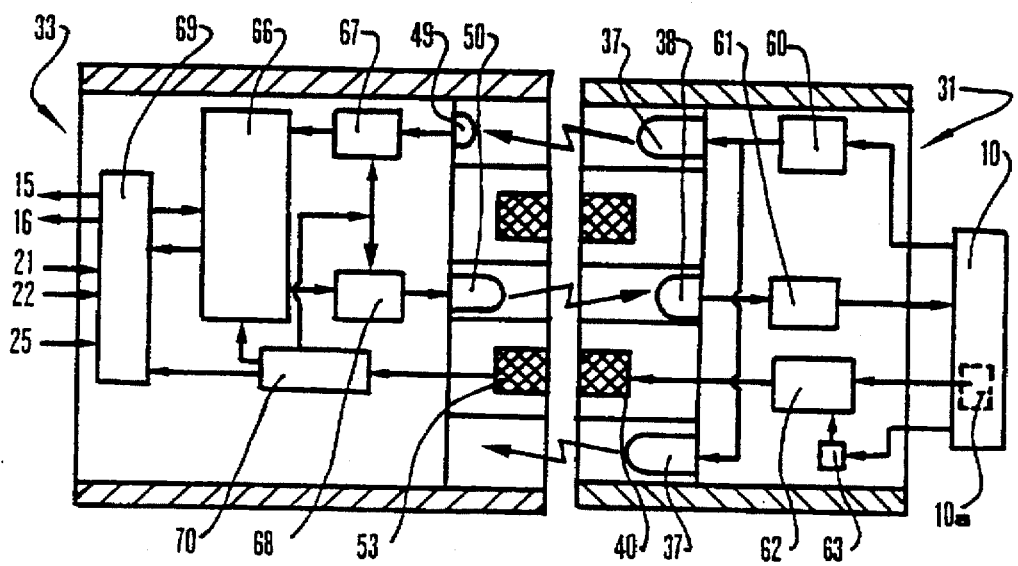
FIG. 6 is a block diagram indicating the functions of some elements of FIG. 3.

In FIG. 6, that refers to some structural parts of FIG. 3, the functional blocks indicate in an extremely schematic way some of the functions of the printed circuits 36 and 48, fixed to the non-rotating part 31 and the rotating part 33, respectively, of the transceiver unit 7. More specifically, as far as the non-rotating part 31 is concerned, block 60 connects unit 10 to LEDs 37 in order to transform the control (or "request" —as detailed hereinafter) signals into signals suitably modulated for the optical transmission to be carried out by the LEDs block 61 connects photodetector 38 to unit 10 in order to transform the signals optically received by photodetector 38 into demodulated electric signals to be sent to unit 10, block 62 connects the power supply source 10a to the first electric windings 40, and represents, substantially, an oscillator that provides an alternating power supply current adapted for being transmitted to the rotating part 33 through the electromagnetic coupling of inductive type, comprising the windings 40 and 53, and block 63 represents a circuit for enabling the functions of block 62 under the control of unit 10. On the other side, in the rotating part 33, block 66 represents a microprocessor processing unit, block 67 connects photodetectors 49 to unit 66 and performs a function substantially similar to that of block 61, block 68 connects unit 66 to LED 50, and performs a function that is substantially similar to that of block 60, block 69 connects unit 66 to motors 15, 16 and to sensors 21, 22 and 25 and its functions are described hereinafter, and block 70 is connected to windings 53 and represents, substantially, a rectifier of the alternating power supply current transmitted through the inductive coupling between the windings 40 and 53 for the power supply of all the circuits of the rotating part.

The operation of the described apparatus is the following. In the course of the grinding operations of mechanical piece 30, generally it is necessary to perform a balancing cycle as a consequence of the replacement or of the dressing of the grinding wheel, and when the control unit 10 picks up, by means of sensor 9 and in relation to the speed of rotation detected by sensor 4a, any values of the vibration parameters that exceed a pre-set maximum limit. In any case the decision as to the performing of the balancing cycle is taken by an operator, or when these anomalous vibrations are detected by the logic controller 4.

In either case, when the need arises to perform a balancing cycle, control unit 10 sends—through the transceiver unit 7—suitable signals to the balancing device 6. In particular, at first there are enabled (block 63) the functions of block 62 for matching, through a first transmission channel comprising windings 40 and 53, the power supply source 10a to the circuits of the rotating part 33. Furthermore, the control signals required for controlling the displacement of masses 13, 14 in determined directions and at determined speeds are transmitted, through a second transmission channel comprising block 60, LEDs 37, photodetectors 49 and block 67. These signals are received by the microprocessor unit 66 that processes them for sending to motors 15, 16, through the circuits of block 69 that control the power supply, suitable controls for driving the displacements of each of the two masses 13, 14 in the aforementioned directions and speeds.

The balancing cycle ends when the values of the surveyed vibration parameters—detected by sensor 9—fall below a pre-set minimum value.

After replacing the grinding wheel and before activating its rotation, it can be advisable to check the position of the masses 13, 14 and, if necessary, bring them to a configuration according to which their centers of gravity are located, substantially, in diametrically opposite positions with respect to axis A, so as to contribute in a negligible way to the out-of-balancing of the rotating set comprising wheel 1, spindle 2 and device 6.

To this purpose, after the coupling between the power supply source 10a and the rotating part 33 has been enabled, unit 10 sends a suitable request signal, through the second transmission channel, to microprocessor unit 66. The latter also receives the signals arriving from the Hall-effect sensors 21 and 22 that detect the rest position of masses 13 and 14 and, if that be the case, sends controls to motors 15 and 16 for causing suitable displacements of masses 13, 14 until this rest position is reached. In this condition, an associated signal is sent to unit 10, by means of the second transmission channel including block 68, LED 50, photodetector 38 and block 61. According to a possible variant to this embodiment, the unit 10 itself, instead of microprocessor unit 66, can directly control the displacements of masses 13 and until the rest position is reached.

The transceiver unit 7 can also be utilized for transmitting to the control unit 10 and, through it, to the logic controller 4, the signals provided by the supplementary vibration detecting sensor 25. These signals indicate the occurrence of a contact between wheel 1 and the piece 30 to be machined, in the course of the mutual approach, or that other contacts of the wheel have occurred, for example with a dressing tool or, accidentally, with other elements. The transmission occurs through the circuits of block 69 and microprocessor unit 66, through the second channel comprising block 68, LED photodetector 38 and block 61.

When the apparatus is in operation the second transmission channel and the microprocessor unit 66 in the rotating part enable the sending to the non-rotating part 31, and thus to unit 10, of so-called "diagnostic" signals, that provide information as to the condition of circuits 48 and of other elements of the rotating set. This takes place, for example, when request signals are sent—through the same second channel—to the microprocessor unit 66 in rotating part 33.

Hereinafter there are listed some of the checks that can be performed.

a) Power supply: the level of the power supply voltage provided by the circuits of block 70 is continuously monitored in the microprocessor unit 66 and possible drops are immediately communicated to the control unit 10. In this way there are promptly detected both anomalies in the circuit components and defects in the installation of the parts (for example it may occur that the distance between the non-rotating part 31 and the rotating part 33 does not correspond to the amount required for obtaining a correct inductive coupling between windings 40 and 53), or the undesirable presence of dirt or other material between the ferromagnetic caps 39 and 52.

b) Control signals: the level of the signal received through the second channel, i.e. the signal received by the photodetector 49 and transformed in block 67, is inspected too, in order to detect when the signal falls below a pre-set threshold value and an appropriate signal is sent by microprocessor unit 66 to the non-rotating part 31. Hence, it is possible to promptly monitor the presence of dirt excessively attenuating the optical signal and so perform a preventive maintenance operation to remove the dirt before the coupling is interrupted. It should be remembered that similar checks of the optical signal arriving from the rotating part 33 through the second transmission channel are performed in the non-rotating part 31, on the basis of the signal transmitted by the receiver circuits of block to control unit 10.

c) Electric motors 15 and 16: the electric connections of motors 15 and 16 and the absence of shortcircuits and of torques exceeding a pre-set limit are inspected in microprocessor unit 66. Any anomalous condition is immediately monitored and communicated through the second transmission channel.

d) Supplementary vibration detecting sensor 25: the connections of sensor 25 are similarly inspected and any possible anomalous conditions are monitored and transmitted by microprocessor unit 66.

The arrangement of the various LEDs (37 and 50) and photodetectors (38 and 49) shown in FIGS. 3–5 enables an optical transmission between the two reciprocally rotating parts 31 and 33 in any mutual angular position, thus providing the previously mentioned second transmission channel.

Figure 7:
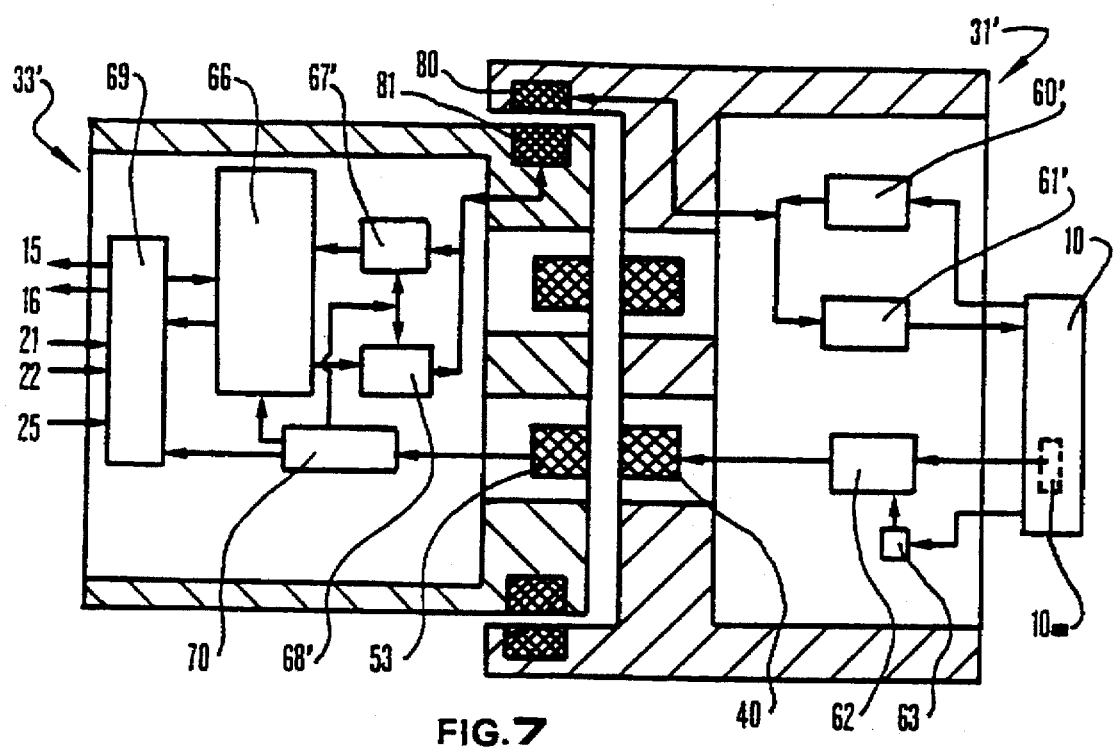
FIG. 7 is a block diagram indicating the functions of some elements of FIG. 3, according to a different embodiment.

The second transmission channel may comprise different means with respect to those previously illustrated and described, for example an electromagnetic bi-directional coupling of inductive type like the one of FIG. 7, that schematically shows a non-rotating part 31' and a rotating part 33'.

The differences between the embodiment of FIG. 7 and that of FIG. 6 consist in the replacement of LEDs 37, 50 and photodetectors 38, 49 with a pair of additional windings 80 and 81, housed in reciprocally facing portions of the non-rotating part 31 and the rotating part 33, respectively. Blocks 60', 61' and 67', 68' have interface functions between unit 10 and winding 80, and between winding 81 and microprocessor unit 66, entirely equivalent to the functions of corresponding blocks 60, 61 and 67, 68 of the embodiment of FIG. 6.

Other variants to the afore described and illustrated apparatus are furthermore possible and consist, for example, in coupling the balancing device 6 externally to spindle 2, and thus to wheel 1, instead of the coupling in cavity 5, in a per se known way.

We claim:

1. An apparatus for the dynamic balancing of a body rotating about a longitudinal axis with respect to a support comprising:

an assembly fixed to and rotating with said body, said assembly comprising
      at least one mass the position of which is adjustable, and
      at least one electric motor connected to adjust the position of the mass;
   a control unit;
   a power supply source; and
   a transceiver unit positioned between said assembly and both the control unit and the power supply source,
   said assembly further comprising circuitry electrically connected to said electric motor for providing signals controlling the motor and thus the displacement and position of the mass, said transceiver unit comprising:
      a first contactless transmission channel coupling the power supply source to the rotating assembly to thereby supply the rotating assembly with power, and
      at least a second contactless transmission channel between the control unit and said circuitry,
   wherein the first transmission channel comprises an electromagnetic coupling, and the second transmission channel is distinct from the first transmission channel and enables a transmission of signals in both directions between the control unit and the circuitry.

2. An apparatus according to claim 1, wherein said transceiver unit comprises a non-rotating part and a rotating part fixed to the support and to the rotating body, respectively, and said first transmission channel comprises windings coupled to the non-rotating part and to the rotating part to define an inductive coupling.

3. An apparatus according to claim 2, wherein said circuitry electrically connected to said motor includes a microprocessor unit.

4. An apparatus according to claim 3, wherein said rotating body defines a longitudinal cavity for housing said assembly and said rotating part of the transceiver unit.

5. An apparatus according to claim 3, wherein said second transmission channel comprises optoelectronic devices adapted to enable said transmission of signals in both directions.

6. An apparatus according to claim 5, wherein the optoelectronic devices comprise light emitting diodes and photodetectors, and each of said non-rotating and rotating parts comprises at least one of said light emitting diodes and at least one of said photodetectors.

7. An apparatus according to claim 6, wherein one of said non-rotating and rotating parts comprises a light emitting diode substantially arranged along the longitudinal axis and at least a photodetector transversally spaced from said axis, and the other of said non-rotating and rotating parts comprises a photodetector substantially arranged along the longitudinal axis and a plurality of light emitting diodes arranged about the axis at a determined distance from it.

8. An apparatus according to claim 3, wherein said second transmission channel comprises additional windings coupled to the non-rotating part and to the rotating part to define an inductive coupling for enabling said transmission of electric signals in both directions.

9. An apparatus according to claim 4, for the dynamic balancing of a grinding wheel of a grinding machine, the grinding wheel being rigidly fixed to the rotating body, the apparatus comprising at least two masses and at least two associated electric motors and additional sensors coupled to the assembly in proximity of the masses for detecting a determined arrangement of the masses, the additional sensors being electrically connected to the microprocessor unit.

10. An apparatus according to claim 9 wherein said additional sensors are Hall-effect magnetic sensors.

11. An apparatus according to claim 3, for the dynamic balancing of a grinding wheel of a grinding machine, the grinding wheel being rigidly fixed to the rotating body, the apparatus further comprising a vibration detecting sensor coupled to the rotating body for providing electric signals responsive to the contact occurring between the grinding wheel and the surface of a piece to be ground.

12. An apparatus according to claim 11, wherein said vibration detecting sensor is secured to said assembly and is electrically connected to the transceiver unit for the transmission of the said electric signals to the control unit through said second contactless transmission channel.

13. An apparatus according to claim 3, wherein said microprocessor unit sends diagnostic signals to said control unit through said second transmission channel.

14. An apparatus according to claim 13, wherein said diagnostic signals include signals indicating that a supply voltage received at said assembly from said power supply source is at an abnormal level.

15. An apparatus according to claim 13, wherein said diagnostic signals include signals indicating that a control signal received at said assembly from said control unit is at an abnormal level.

16. An apparatus as in claim 13, wherein said diagnostic signals include a signal indicating an abnormal condition of said electric motor.

17. An apparatus as in claim 13, wherein said diagnostic signals include a signal a signal indicating an abnormal condition of one or more sensors at said assembly.

* * * * *

UNITED STATES PATENT AND TRADEMARK OFFICE
CERTIFICATE OF CORRECTION

PATENT NO. : 5,688,160
DATED : November 18, 1997
INVENTOR(S) : Mario Pozzetti and Domenico Malpezzi It is certified that error appears in the above-identified patent and that said Letters Patent is hereby corrected as shown below:

Column 1, 10th line, change "reaction" to --position--;

Column 1, 11th line, change "naster" to --motor--;

Column 1, 12th line, --coupler positioned-- should be inserted between "a" and "between";

Column 1, 33rd line, --devices-- should be inserted between "balancing" and "are";

UNITED STATES PATENT AND TRADEMARK OFFICE
CERTIFICATE OF CORRECTION

PATENT NO. : 5,688,160
DATED : November 18, 1997
INVENTOR(S) : Mario Pozzetti and Domenico Malpezzi It is certified that error appears in the above-identified patent and that said Letters Patent is hereby corrected as shown below:

Column 2, 31st line, --the motor and thus-- should be inserted after "controlling";

Column 2, 31st-32nd lines, "the matter and thus" should be deleted;

Column 3, 14th line, "I" should read --1--;

Column 3, 32nd line, "al and" should be changed to --21 and 22.--;

UNITED STATES PATENT AND TRADEMARK OFFICE
CERTIFICATE OF CORRECTION

PATENT NO. : 5,688,160

DATED : November 18, 1997

INVENTOR(S) : Mario Pozzetti and Domenico Malpezzi

It is certified that error appears in the above-identified patent and that said Letters Patent is hereby corrected as shown below:

Column 3, 37th line, --21,-- should be inserted after "sensors";

Column 3, 47th line, --of-- should be inserted after "condition";

Column 3, 53rd line, change "i" to --1--;

Column 4, 26th line, --51-- should be inserted after "element";

UNITED STATES PATENT AND TRADEMARK OFFICE
CERTIFICATE OF CORRECTION

PATENT NO. : 5,688,160
DATED : November 18, 1997
INVENTOR(S) : Mario Pozzetti and Domenico Malpezzi It is certified that error appears in the above-identified patent and that said Letters Patent is hereby corrected as shown below:

Column 4, 27th line, --53-- should be inserted after "windings";

Column 4, 31st line, --46-- should be inserted after "and";

Column 5, 15th line, change "4a" to --42--;

Column 6, 5th line, --50-- should be inserted after "LED";

Column 6, 8th line, --33-- should be inserted after "part";

UNITED STATES PATENT AND TRADEMARK OFFICE
CERTIFICATE OF CORRECTION

PATENT NO. : 5,688,160

DATED : November 18, 1997

INVENTOR(S) : Mario Pozzetti and Domenico Malpezzi

It is certified that error appears in the above-identified patent and that said Letters Patent is hereby corrected as shown below:

Column 6, 42nd line, --61-- should be inserted after "block";

Column 8, 26th line, --,-- should be inserted after "9"; and

Column 8, 55th line, the second occurrence of "a signal" should be deleted.

Signed and Sealed this

Fifth Day of May, 1998

Attest:

BRUCE LEHMAN

*Attesting Officer*  *Commissioner of Patents and Trademarks*